United States Patent
Kwon et al.

(10) Patent No.: US 9,129,713 B2
(45) Date of Patent: Sep. 8, 2015

(54) PASSIVE HIGH PRESSURE SAFETY INJECTION TANK SYSTEM (HPSIT) FOR RESPONDING TO STATION BLACKOUT (SBO) AND LOSS-OF-COOLANT ACCIDENTS (LOCA)

(75) Inventors: Tae-Soon Kwon, Daejeon (KR); Dong-Jin Euh, Daejeon (KR); Chul-Hwa Song, Daejeon (KR); Won-Pil Baek, Daejeon (KR)

(73) Assignee: Korea Atomic Energy Research Institute (KR)

( * ) Notice: Subject to any disclaimer, the term of this patent is extended or adjusted under 35 U.S.C. 154(b) by 597 days.

(21) Appl. No.: 13/189,871

(22) Filed: Jul. 25, 2011

(65) Prior Publication Data

US 2012/0263268 A1   Oct. 18, 2012

(30) Foreign Application Priority Data

Apr. 15, 2011   (KR) ........................ 10-2011-0035192

(51) Int. Cl.
| | | |
|---|---|---|
| G21C 9/00 | (2006.01) | |
| G21C 15/18 | (2006.01) | |
| G21D 3/06 | (2006.01) | |

(52) U.S. Cl.
CPC   *G21C 15/18* (2013.01); *G21D 3/06* (2013.01); *Y02E 30/40* (2013.01)

(58) Field of Classification Search
CPC ........ G21C 15/182; G21C 9/00; G21C 15/18; G21D 3/04
See application file for complete search history.

(56) References Cited

U.S. PATENT DOCUMENTS

| | | | | |
|---|---|---|---|---|
| 3,859,166 A | * | 1/1975 | Flynn et al. | 376/282 |
| 5,259,008 A | | 11/1993 | Schulz | |
| 5,268,943 A | | 12/1993 | Corletti et al. | |
| 5,309,488 A | * | 5/1994 | Matsuoka | 376/282 |
| 5,377,242 A | * | 12/1994 | Carlton et al. | 376/282 |
| 2004/0084081 A1 | | 5/2004 | Liu et al. | |
| 2008/0317193 A1 | * | 12/2008 | Sato | 376/282 |

FOREIGN PATENT DOCUMENTS

| | | |
|---|---|---|
| CN | 101847451 A | 9/2010 |
| JP | S63173997 A | 7/1988 |
| KR | 10-0856501 | 8/2008 |

OTHER PUBLICATIONS

Zhang et al., "Application of the WCOBRA/TRAC best-estimate methodology to the AP600 large-break LOCA analysis", Nuclear Engineering and Design 186 (1998) pp. 279-301.
Schulz, T.L., "Westinghouse AP1000 advanced passive plant," Nuclear Engineering and Design 236 (2006), pp. 1547-1557.
(Continued)

*Primary Examiner* — Jack W Keith
*Assistant Examiner* — Sharon M Davis
(74) *Attorney, Agent, or Firm* — Fredrikson & Byron P.A.

(57) ABSTRACT

A high pressure safety injection tank (HPSIT) system includes one safety injection tank (HIT) which replaces a core makeup tank (CMT) and a low pressure (approximately 4.3 Mpa or below) safety injection tank (SIT) and which can shift to and operate on a high pressure (approximately 17 Mpa) operation mode, to enable injection of emergency core coolant into a reactor system both under low pressure (approximately 4.3 Mpa or below) and high pressure (approximately 17 Mpa).

14 Claims, 14 Drawing Sheets

(56) References Cited

OTHER PUBLICATIONS

Yusung, T. et al., "Assessment of RELAP5/MOD3.1 for Gravity-Driven Injection Experiment in the Core Markup Tank of the CARR Passive Reactor (CP-1300)," NUREG/IA-0134, CAMP005, Oct. 1996 (156 pgs.).

Aksan, N. et al, "Passive Safety Systems and Natural Circulation in Water Cooled Nuclear Power Plants," International Atomic Energy Agency (IAEA), IAEA-TECDOC-1624, 2009, 159 pgs.

English abstract of KR10-0856501, 2 pages.

\* cited by examiner

-- Prior Art --

-- Prior Art --

-- Prior Art --

PASSIVE HIGH PRESSURE SAFETY INJECTION TANK SYSTEM (HPSIT) FOR RESPONDING TO STATION BLACKOUT (SBO) AND LOSS-OF-COOLANT ACCIDENTS (LOCA)

CROSS-REFERENCES TO RELATED APPLICATIONS

This patent application claims the benefit of priority from Korean Patent Application No. 10-2011-0035192, filed on Apr. 15, 2011, the contents of which are incorporated herein by reference in its entirety.

BACKGROUND OF THE INVENTION

1. Field of the Invention

The invention relates to a high pressure safety injection tank (HPSIT) system of an emergency core cooling system (ECCS) of a nuclear reactor, which enables makeup of a nuclear reactor emergency core both when the nuclear reactor system is under low pressure (approximately 4.3 Mpa) and when nuclear reactor system is under high pressure (approximately 17 Mpa), while using only one safety injection tank (SIT), and which uses a valve driven by a battery-generated emergency power during "Station Blackout" accident in which all the off-site and on-site power is lost to thus enable emergency core coolant injection by a HPSIT, and simplifies the system design and accident management, and also reduces possibility of accidents of the nuclear reactor.

2. Description of the Related Art

FIG. 1 is a conceptual view of a conventional low pressure safety injection tank (LPSIT) of a pressured water reactor (PWR) type of nuclear reactor. FIG. 2 illustrates a conventional complex system of core makeup tank (CMT) and safety injection tank (SIT). FIG. 3 illustrates a constitution of CMT without charging gas for large-scale injection into low pressure reactor system.

FIG. 4 is a graph representing overheating problem of a reactor during large break accident, experienced in a conventional construction in which only the CMT without charging gas is applied, FIG. 5 is a graph representing insufficient recharging problem of a reactor during large break accident, experienced in a conventional construction in which only the CMT without charging gas is applied, and FIG. 6 is a graph representing insufficient recharging problem of a reactor under low pressure condition during large break accident, experienced in a conventional construction in which only the CMT without charging gas is applied Referring to the accompanying drawings, the currently-available SIT 4 of the PWR is installed to respond to postulated large break accidents (LBA) where a high flowrate of nuclear reactor coolant is leaked out at once, by rapidly recharging a nuclear reactor system, i.e., by recharging a depressurized nuclear reactor vessel 2 from which coolant has run out, with a high flowrate of emergency core coolant.

However, if nuclear reactor is pressurized due to an accident, the pressure of the nuclear reactor system will escalate to exceed the operation pressure (approximately 4.3 Mpa) of the SIT 4. Accordingly, the emergency core coolant cannot be injected into the nuclear reactor system.

In the meantime, an injection isolation valve on an injection line of the SIT 4 equipped in the current pressurized light water reactor (PWR) is not activated during "Station Blackout" event in which all the on-site and off-site power of the nuclear power plant including emergency diesel generators (EDG) and alternate AC source (AAC) are lost.

As a result, the LPSIT 4 currently installed in the pressurized light water reactor (PLWR) is not capable of constantly injecting the emergency core coolant to the nuclear reactor system under certain events such as 'Station Blackout' accidents or pressurization of the reactor.

Further, the Westinghouse AP600 reactor system of U.S. Pat. No. 5,268,943, or Nuclear Engineering and Design Vol. 186, pp. 279-301, or core makeup tank (CMT) 3 of CARR (CP1300, NuREG-IA-0134) relies on the pressure equalization between the nuclear reactor system and the CMT 3 to allow injection of coolant. That is, since the coolant is injected by utilizing the gravity-driven pressure due to different water levels between the emergency core coolant within the CMT 3 and the nuclear reactor system, a high flowrate of emergency core coolant cannot be supplied to efficiently recharge the reactor vessel 2, leading to core uncovery and rapid escalation of the core temperature.

Accordingly, the Westinghouse AP600 adopts a complex design using CMT 3 and SIT 4 in combination to cover major operation areas, respectively.

Further, in the CMT 3 employing the construction as AP600 or CARR (CP1300), high pressure of the reactor coolant system (RCS) (or that of pressurizer 4) is used to pressurize the CMT 3 if the reactor system is under high pressure and thus make up the coolant of the reactor, or the SIT 4 is used to inject the emergency core coolant if the reactor is under low pressure.

However, there are drawbacks of the above-explained construction. That is, the amount of injection supplied from the CMT 3 alone is insufficient to meet the demand at the reactor system under low pressure, while there is an adverse pressure difference between the SIT 4 at low pressure and the reactor system, thus making it impossible to inject the emergency core coolant into the reactor system.

Accordingly, CMT 3 and SIT 4 can be effectively used only in combination. That is, CMT 3 and SIT 4 cannot be used independently from each other in the safety system. Since it is restricted to apply nitrogen-charge pressure design for CMT 3, CMT 3 is not capable of ensuring a large pressure difference between the two systems sufficient to ensure a high flowrate of core makeup coolant when the reactor system is under low pressure. This is because the conventional low pressure SIT 4 of the PWR is not designed to operate under high pressure, i.e., under approximately 4.3 Mpa or above.

FIG. 3 illustrates an example of a constitution of CMT system from which nitrogen charge pressure design is omitted, which induces a low flowrate of emergency core coolant injection by the sole injection from the CMT. In large break accident, the pressure of the reactor system rapidly decreases due to low pressure of the pressure containment vessel, thus leading to a very slight difference of pressure between the CMT and reactor system. That is, the CMT system of FIG. 3 cannot ensure sufficient pressure difference to induce a large flowrate of emergency core coolant injection. Accordingly, the CMT construction of FIG. 3 is not applicable, since according to this design, the temperature of the core of the reactor will rapidly escalate to exceed the acceptable range for the reactor design.

Since CMT 3 adopts a principle of pressure head gravity-driven injection in which the pressure is equalized between the reactor system and CMT 3 and the difference of water level of the two systems is utilized, the flowrate of emergency core coolant injection does not vary significantly between when the reactor system is at low pressure and when the reactor system is at high pressure.

Although the above does not pose a considerable problem when the reactor system is under high pressure condition, a severe core heating and uncovery can be resulted on specific occasions such as large break accident in which the reactor is depressurized rapidly and coolant is released in massive amount, because it is impossible to recharge the reactor rapidly.

FIG. 4 illustrates the temperature of the core of the above-explained reactor system design, based on the result of calculating a mock large break accident of a reactor with interpretive codes. If CMT design is exclusively applied to ECCS, the core cladding temperature exceeds far beyond the acceptable temperature range of the nuclear power plant.

FIG. 5 illustrates a downcomer (DC) of a reactor system which is insufficiently charged by CMT. The design with the conventional CMT alone shows far lower water level than that (in blue) of the DC by the design of the high pressure safety injection tank (HPSIT) according to an embodiment.

FIG. 6 illustrates a flowrate comparison of emergency core coolant injection between the low pressure SIT charged with nitrogen on the one hand, and a conventional CMT on the other hand, with both at large break accidents. CMT (in red) has a considerably lower flowrate of emergency core coolant injection into the reactor. That is, SIT without nitrogen charge, or a conventional CMT alone cannot ensure a sufficient flowrate of emergency core coolant injection to refill the reactor when large break accident occurs. Accordingly, the requirements for nuclear power plant design are not satisfied.

SUMMARY OF THE INVENTION

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

An object of the present invention is to provide a high pressure safety injection tank (HPSIT) system, which enables recharging process both under high pressure and low pressure with use of a sole safety injection tank (SIT) to simplify the system design, and which can provide simplified accident mitigation, uses a valve drivable by a battery-supplied emergency power to enable injection of emergency core coolant by the HPSIT even under 'Station Blackout' with a loss of off-site and on-site power and thus reduces possibility of accidents of the reactor.

In order to achieve the above object of the present invention, a HPSIT system according to an embodiment, provided as a replacement for a combination of core makeup tank (CMT) and low pressure safety injection tank (SIT), includes an injection system of a reactor emergency core coolant which is capable of switching between low pressure injection mode and high pressure injection mode while using only one SIT. Further, even in 'Station Blackout' accident in which all the off-site and on-site emergency power of the nuclear power plant is lost by malfunction, the HPSIT system according to an embodiment uses a valve which is drivable by a battery-supplied emergency power to enable injection of emergency core coolant by the HPSIT.

In one embodiment, the HPSIT may include a safety injection tank (SIT) into which a low pressure (approximately 17 MPa) nitrogen is charged and in which emergency core coolant is housed, the SIT connected to a reactor vessel through an emergency coolant injecting pipe, a pressurizer in which a high pressure (approximately 17 Mpa) steam is housed, and on which a safety valve pipe is mounted to discharge the high pressure steam, and a pressure equalization pipe which is selectively openable and closable, and which connects an upper portion of the SIT and an upper portion of the pressurizer to equalize the pressure between the pressurizer under high pressure and the SIT under low pressure. The pressure equalization pipe is open to cause the SIT to shift from low pressure (approximately 4.3 Mpa) condition to high pressure condition during an accident that pressurizes a reactor system, so that the emergency core coolant is introduced into the reactor vessel.

In one embodiment, the HPSIT may include a nitrogen gas exhaust pipe which connects an upper portion of the SIT and the safety valve pipe, and which is constructed to selectively discharge nitrogen gas when high pressure steam of the pressurizer is introduced into the safety injection tank.

According to embodiments, the HPSIT system advantageously provides a complex function that combines function of CMT which is effective under low pressure condition, and function of SIT which is effective under low pressure condition together.

That is, unlike conventional systems such as AP600 or CP1300 which operate either low pressure safety injection tank or core makeup tank independently depending on whether the systems are under low pressure (approximately 4.3 Mpa) or high pressure (approximately 17 Mpa), an embodiment enables emergency core coolant refilling of reactor system both under high pressure and low pressure conditions by using SIT alone, thereby providing simplified system design, simplified emergency mitigation, and also reduced possibility of reactor accidents.

Further, in one embodiment, since a motor valve is implemented to open and close by a separate battery power, all the valves can be operated even under 'Station Blackout' when all the off-site and on-site power is lost.

BRIEF DESCRIPTION OF THE DRAWINGS

The above and/or other aspects of what is described herein will be more apparent by describing certain exemplary embodiments with reference to the accompanying drawings, in which.

DETAILED DESCRIPTION OF EXEMPLARY EMBODIMENTS

Features and advantages of the present invention will be more clearly understood by the following detailed description of the present preferred embodiments by reference to the accompanying drawings. It is first noted that terms or words used herein should be construed as meanings or concepts corresponding with the technical spirit of the present invention, based on the principle that the inventors can appropriately define the concepts of the terms to best describe their own invention. Also, it should be understood that detailed descriptions of well-known functions and structures related to the present invention will be omitted so as not to unnecessarily obscure the important point of the present invention.

In one embodiment, one single safety injection tank (SIT), capable of shifting to high pressure condition, is provided as a replacement for the core makeup tank (CMT) and low pressure SIT, according to which it is possible to inject emergency core coolant to nuclear reactor system both under low pressure and high pressure conditions.

Figure 1:
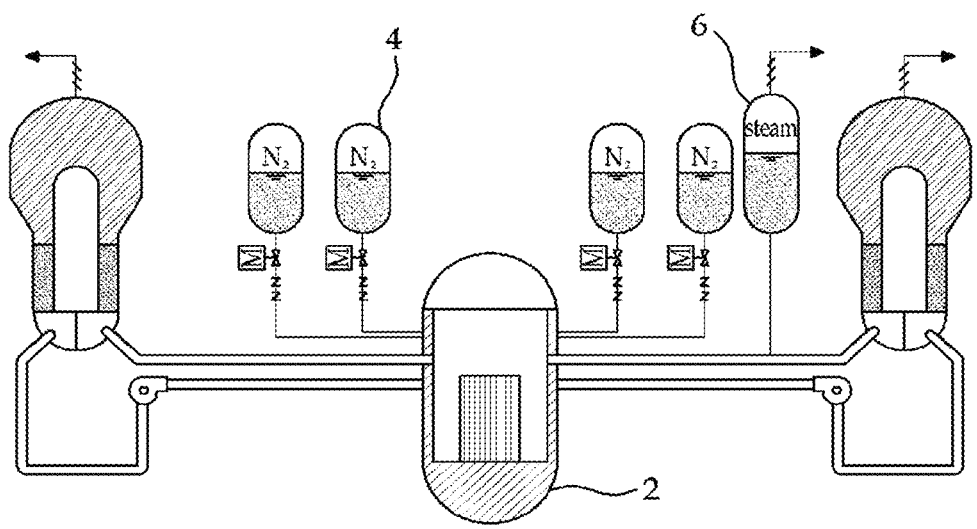
FIG. 1 is a conceptual view of a conventional low pressure safety injection tank (LPSIT)
Figure 2:
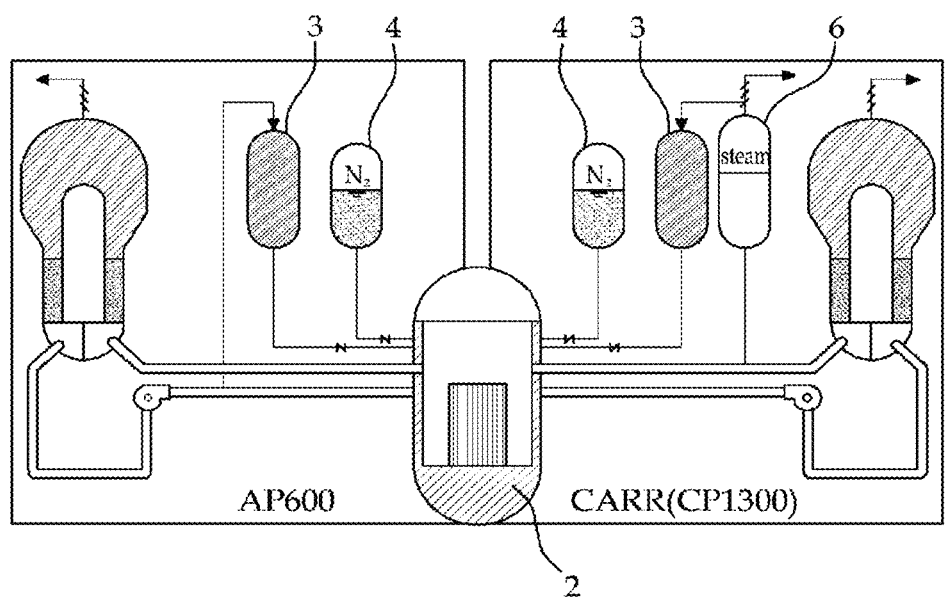
FIG. 2 shows a constitution of a conventional core makeup tank (CMT) and safety injection tank (SIT)
Figure 3:
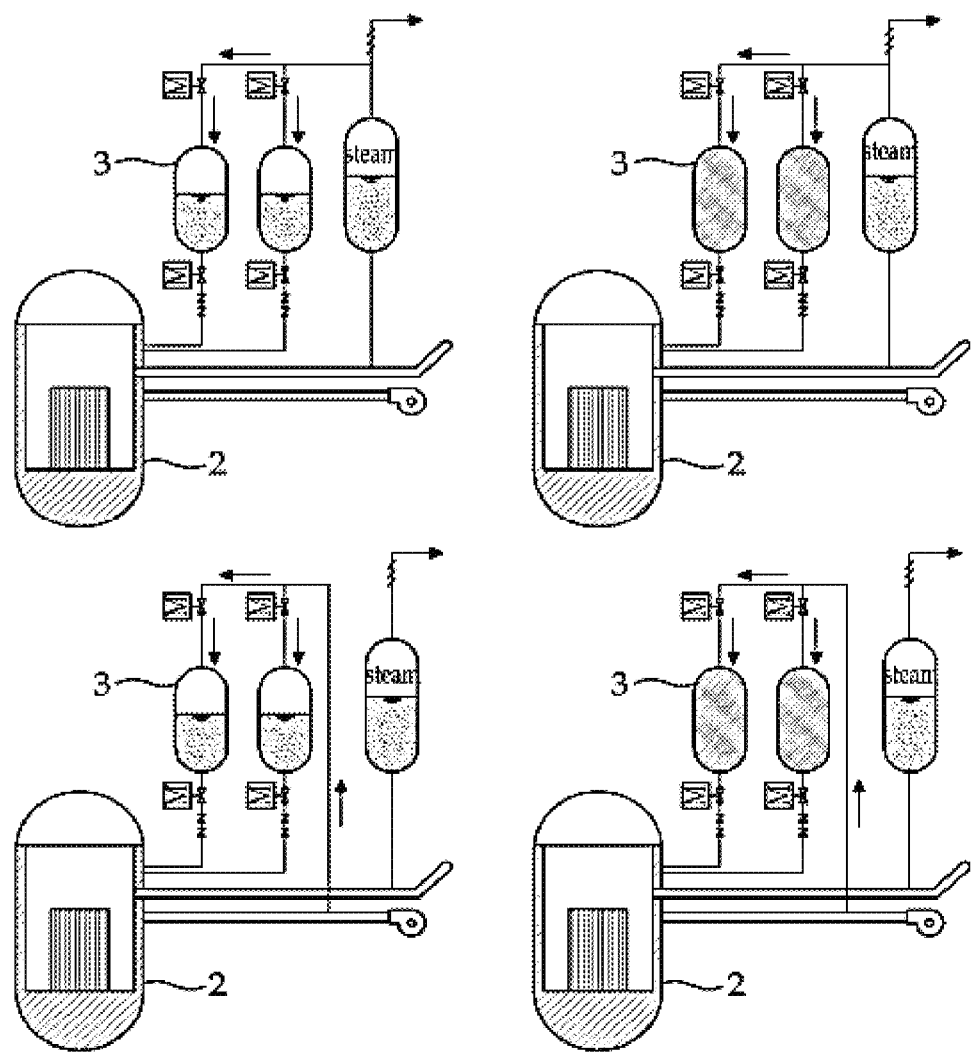
FIG. 3 illustrates a constitution of CMT without charging gas for large-scale injection into low pressure reactor system.
Figure 4:
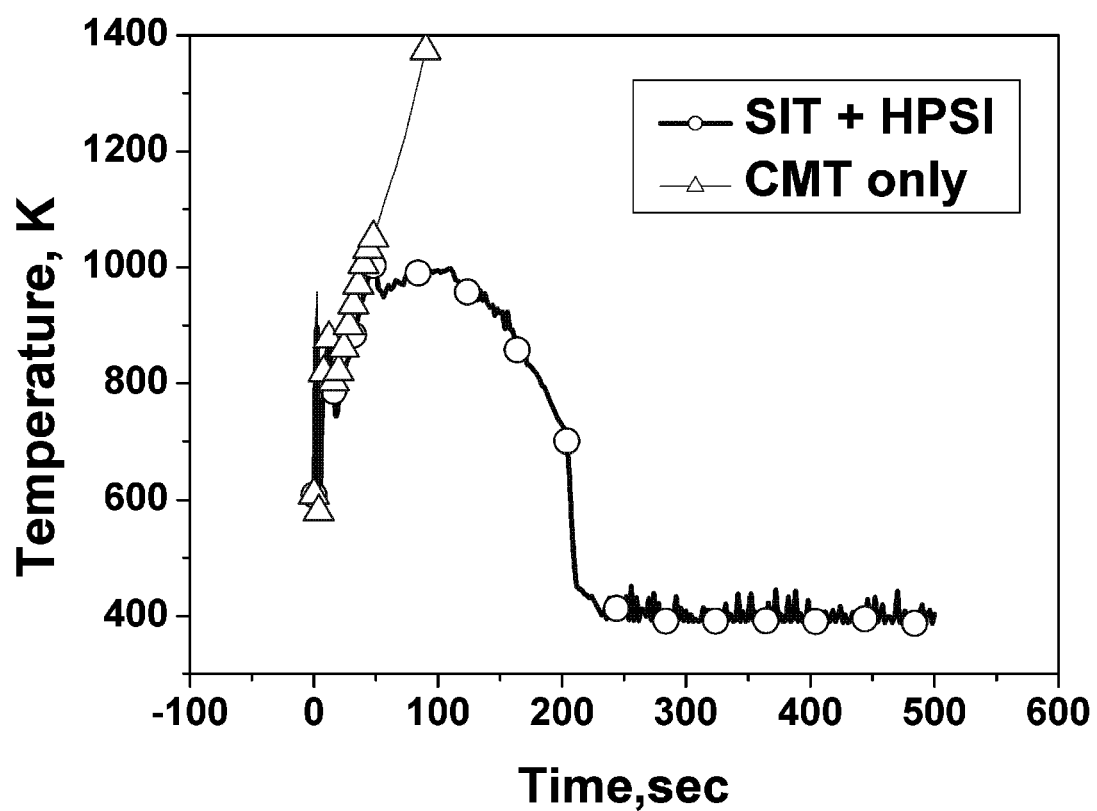
FIG. 4 is a graph representing overheating problem of a reactor during large break accident, experienced in a conventional construction in which CMT without charging gas alone is applied.
Figure 5:
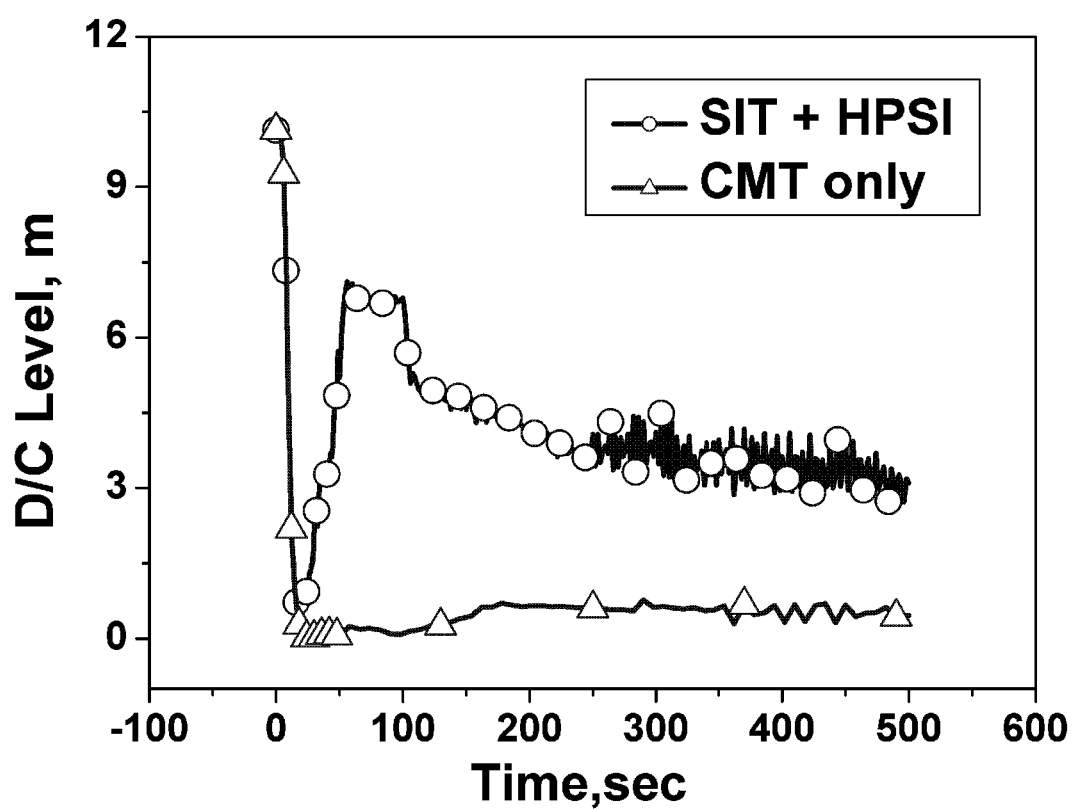
FIG. 5 is a graph representing insufficient recharging problem of a reactor during large break accident, experienced in a conventional construction in which only the CMT without charging gas is applied.
Figure 6:
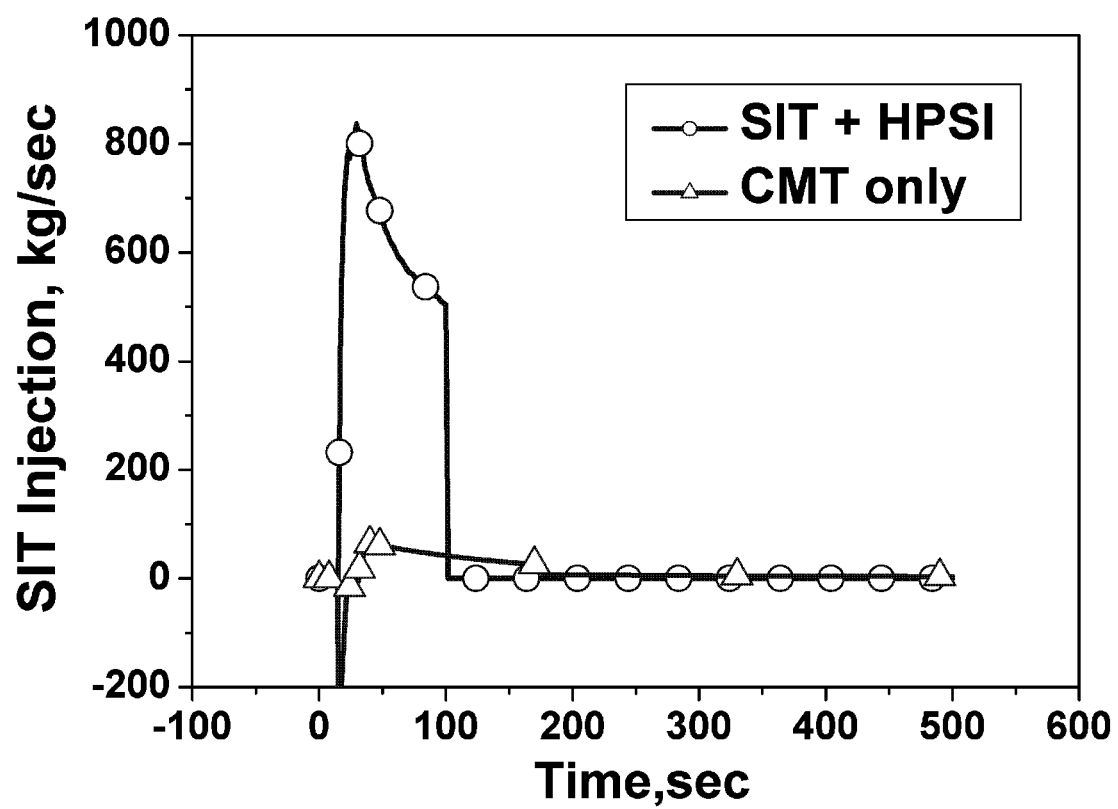
FIG. 6 is a graph representing insufficient recharging problem of a reactor under low pressure condition during large break accident, experienced in a conventional construction in which only the CMT without charging gas is applied.
Figure 7:
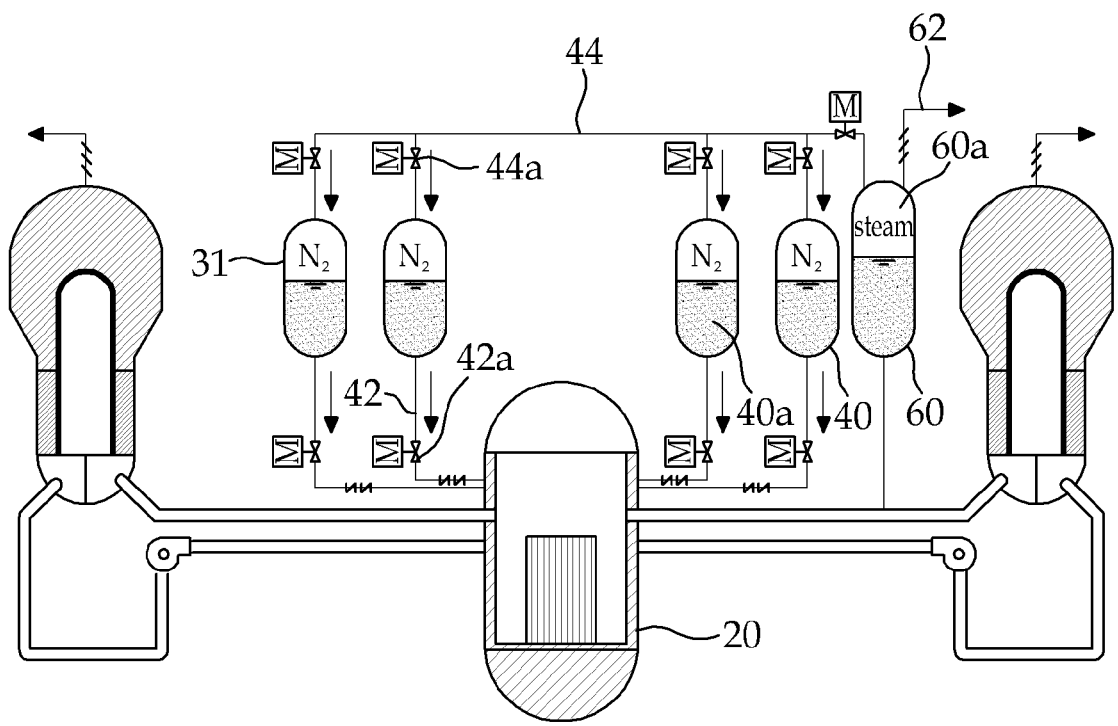
FIG. 7 illustrates a constitution of a HPSIT system according to an embodiment.
Figure 8:
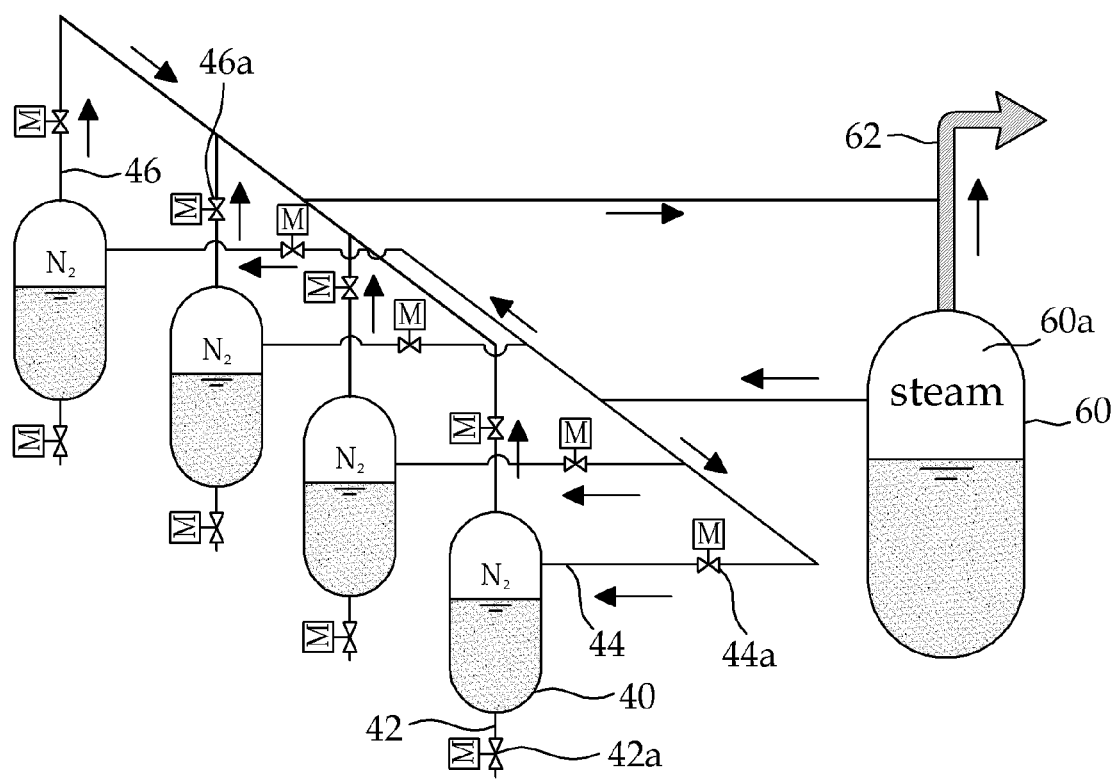
FIGS. 8 and 9 illustrate HPSIT system of FIG. 7 added with a nitrogen gas exhaust pipe according to an embodiment.
Figure 9:
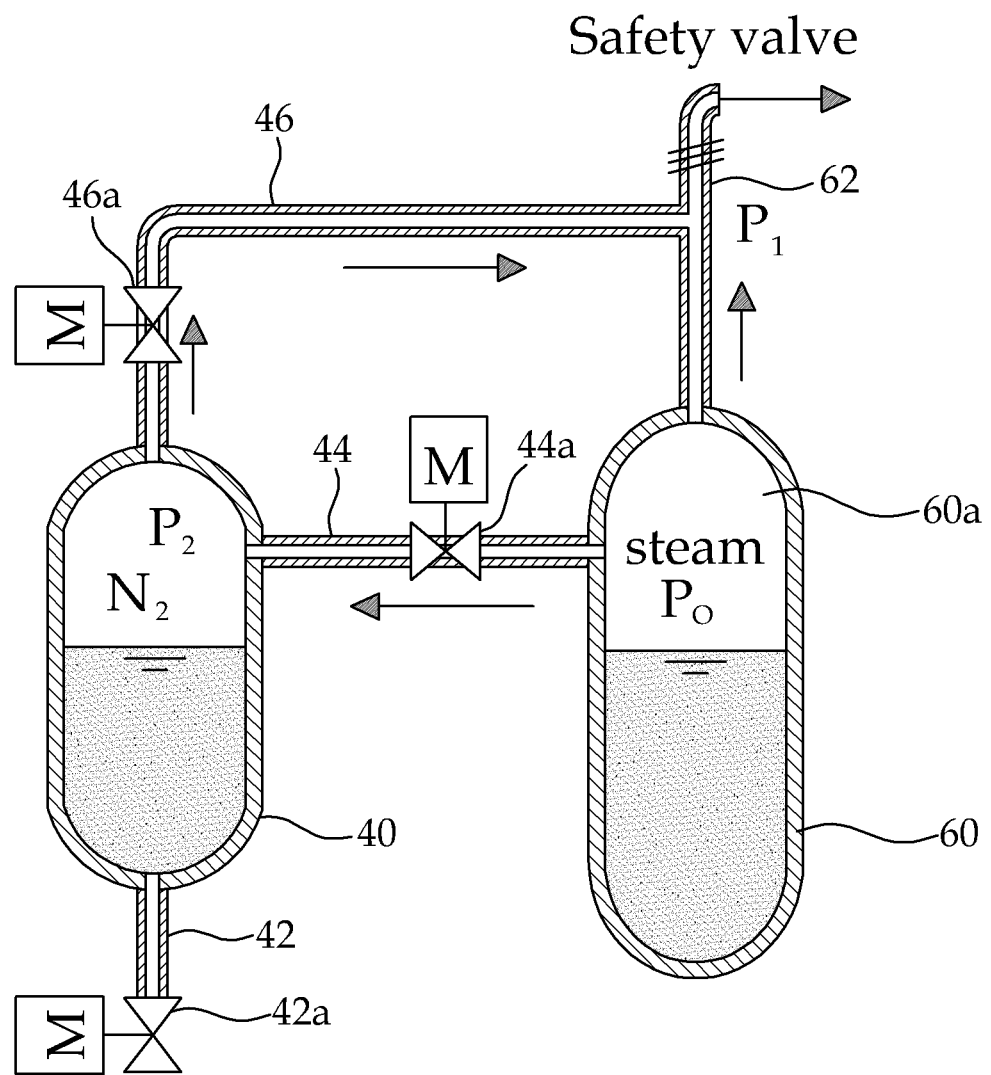
Figure 10:
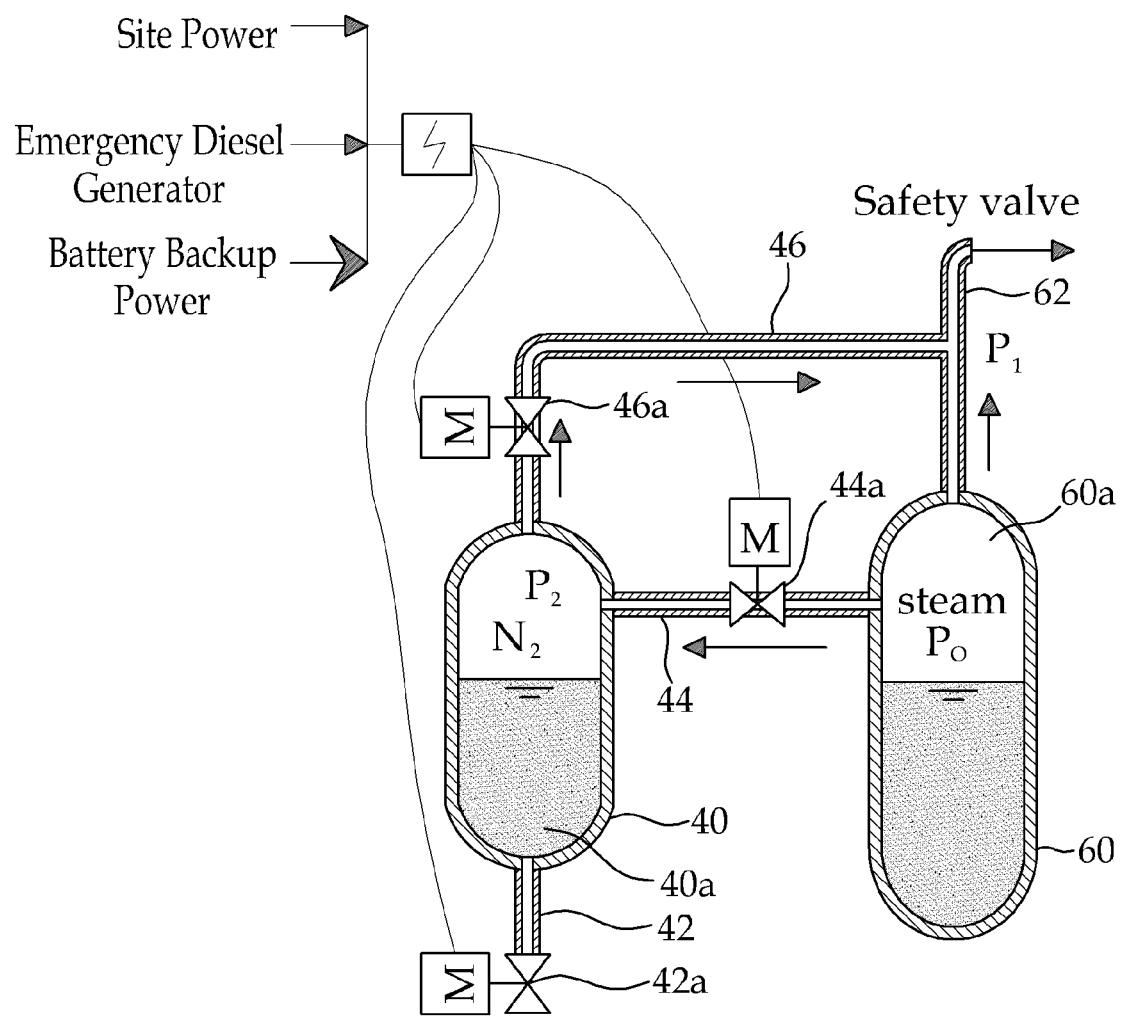
FIG. 10 illustrates HPSIT system of FIG. 9 additionally equipped with a motor valve driven on a battery-supplied emergency power.

FIG. 7 illustrates a constitution of a HPSIT system according to an embodiment, FIGS. 8 and 9 illustrate HPSIT system of FIG. 7 added with a nitrogen gas exhaust pipe according to an embodiment, and FIG. 10 illustrates HPSIT system of FIG. 9 additionally equipped with a motor valve driven on a battery-supplied emergency power.

Referring to the drawings, an embodiment includes a safety injection tank (SIT) 40 housing therein emergency core coolant 40a, a pressurizer 60 housing therein high pressure steam 60a, and a pressure equalization tube 44 connecting the SIT 40 and the pressurizer 60.

The SIT 40 may be constructed so that low pressure (approximately 4.3 Mpa) nitrogen is charged thereinto and the emergency core coolant 40a is housed therein. Additionally, the SIT 40 may be connected to the nuclear reactor system, i.e., to the reactor vessel 20 by an emergency coolant injecting pipe 42. Accordingly, the emergency core coolant 40a is injected into the reactor vessel 20, i.e., into the reactor system through the emergency coolant injecting pipe 42. An injection isolation valve 42a, which is selectively openable and closable, may be mounted on the emergency coolant injecting pipe 42.

Further, the pressurizer 60 may be constructed so that high pressure steam 60a is housed therein.

The pressure equalization pipe 44 may be connected to an upper portion of the SIT 40 and upper portion of the pressurizer 60 to equalize the pressure between the high pressure pressurizer 60 and the low pressure SIT 40. A pressure equalization valve 44a, which is selectively openable and closable, may be mounted on the pressure equalization pipe 44.

In one embodiment, the SIT 40 is shifted to high pressure mode by the opening of the pressure equalization pipe 44 to thus allow the emergency core coolant 40a to be injected into he high pressure reactor vessel 20.

To be specific, the SIT 40 and the pressurizer 60 are connected to each other so that the reactor vessel 20 can be maintained under such pressure that can allow the emergency core coolant 40a from the SIT 40 to be injected into the reactor vessel 20 even under the high pressure operation where the safety valve of the pressurizer 60 is operated, since the high pressure steam of the pressurizer 60 is injected into the SIT 40 which is under low pressure condition.

Referring to FIGS. 8 and 9 illustrating an embodiment, a nitrogen gas exhaust pipe 46 may additionally be provided to connect the upper portion of the SIT 40 and a safety valve pipe 62, to allow the nitrogen gas to be selectively released when the high pressure steam 60a of the pressurizer 60 is introduced into the SIT 40. A nitrogen gas release isolation valve 46a, which is selectively openable and closable, may be mounted on the nitrogen gas exhaust pipe 46.

Figure 14:
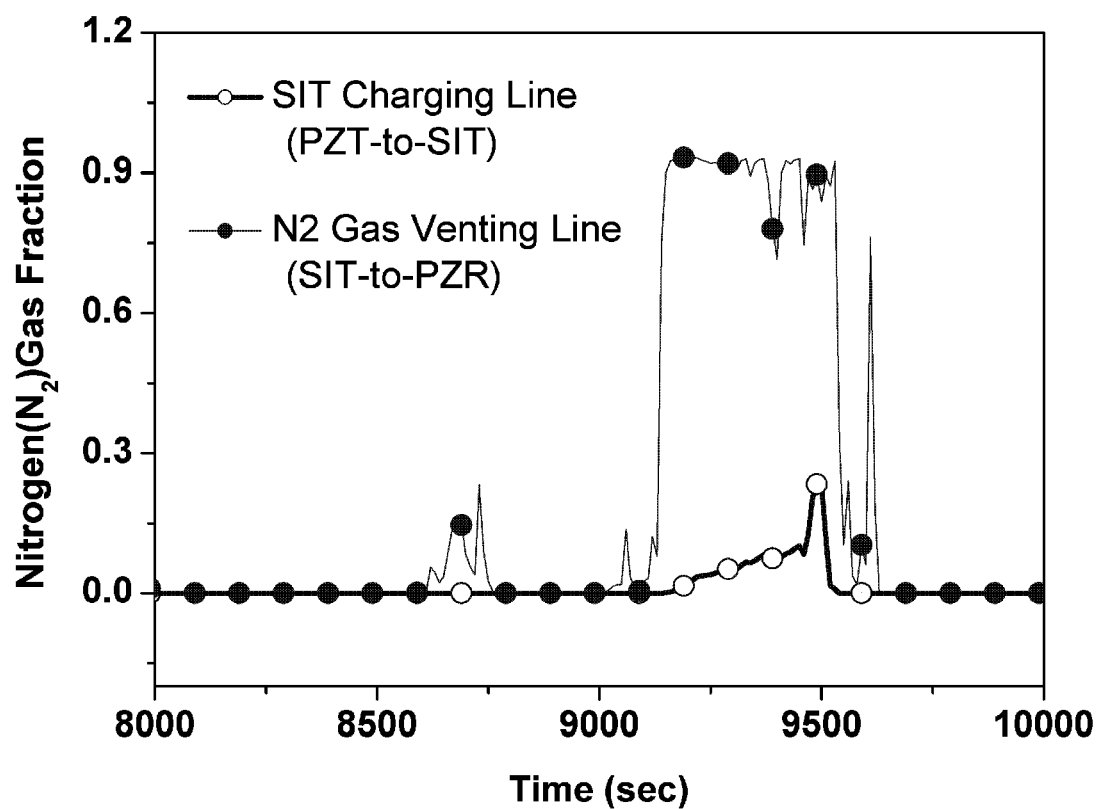
FIG. 14 is a graph representing effectiveness of adding nitrogen gas exhaust pipe according to an embodiment.

If the nitrogen gas is additionally provided as illustrated in FIG. 14, the nitrogen gas fraction of the nitrogen gas exhaust pipe 46 of the high pressure SIT 40 into the safety valve of the pressurizer 60 is relatively higher than that of the pressure equalization pipe 44 from the pressurizer 60 to the high pressure SIT 40. Accordingly, as illustrated in FIG. 14, if nitrogen gas exhaust pipe is additionally provided, steam mainly flows from the pressurizer 60 toward the high pressure SIT 40, while the nitrogen gas from the pressurizer 60 mainly escapes from the high pressure SIT 40 toward the pressurizer safety valve pipe 62 through the nitrogen gas exhaust pipe 46.

In an initial state where the pressure equalization valve 44a of the pressure equalization pipe 44 is submerged, there is a considerably high pressure difference between the pressurizer 60 and the SIT 40. That is, the pressure ($P_o$) of the pressurizer 60 is considerably higher than the nitrogen pressure ($P_2$) of the SIT 40.

Then as the pressure equalization valve 44a opens, the high pressure steam of the pressurizer 60 is injected into nitrogen gas part of the SIT 40, and as a result, the pressure difference between the two systems is eliminated.

There is an advantage in that the thermal shock caused when the steam introduced into the nitrogen gas is significantly less than the evaporation-condensation pressure oscillations that are caused when the steam is introduced into cool water.

Further, in situations where the safety valve of the pressurizer 60 is open to release the steam, the static pressure ($P_1$) is lower than the pressure ($P_o$) of the pressurizer 60 or the pressure ($P_2$) at the nitrogen gas of the SIT 40, due to the velocity of the steam flowing toward the safety valve pipe 62 of the pressurizer 60.

Under this situation, the pressure gradient is formed in a direction flowing from the nitrogen gas exhaust pipe 46 of the SIT 40 to the safety valve pipe 62 of the pressurizer 60, so that the nitrogen gas is discharged through the safety valve pipe 62 of the pressurizer 60 of the SIT 40, and the nitrogen gas part of the SIT 40 is filled with the steam to thus maintain the identical pressure as that of the reactor system.

As explained above, since the SIT 40 injects a high flowrate of emergency core coolant 40a into the reactor with the pressure of the charged nitrogen gas under low pressure operation, while conducting high pressure injection using opening of the injection isolation valve 42a of the pressure equalization valve 44a of the pressure equalization pipe 44 and the emergency coolant injecting pipe 42 under high pressure operation, the SIT 40 can be used irrespective of whether the reactor system is in low pressure condition or high pressure condition.

Meanwhile, an embodiment enables injection of the emergency core coolant 40*a* of the SIT 40 even under 'Station Blackout' in which off-site and on-site power including emergency diesel generators is lost, by implementing motor valves for the injection isolation valve 42*a*, the pressure equalization valve 44*a* and the nitrogen gas exhaust isolation valve 46*a* so that these valves can be open and closed with separate battery power during accident.

Accordingly, the injection isolation valve 42*a*, the pressure equalization valve 44*a* and the nitrogen gas exhaust isolation valve 46*a* are each drivable by power supply from corresponding batteries. Accordingly, the valves 42*a*, 44*a*, 46*a* may be independently driven by corresponding power supplies.

In a conventional power supply design where the power is supplied only from on-site and off-site power and emergency diesel generators, the injection isolation valve 42*a* of the SIT 40 is not operated during 'Station Blackout' accident, leading to failure of makeup of the emergency core coolant 40*a* by the SIT 40.

However, according to an embodiment, the valves can be open and closed even under accident where all the off-site and on-site power is lost, with the supply of electricity from the battery.

The differences between an embodiment and the conventional art during 'Station Blackout' accident will be explained below with reference to the graphs provided by FIGS. 11 to 13.

Figure 11:
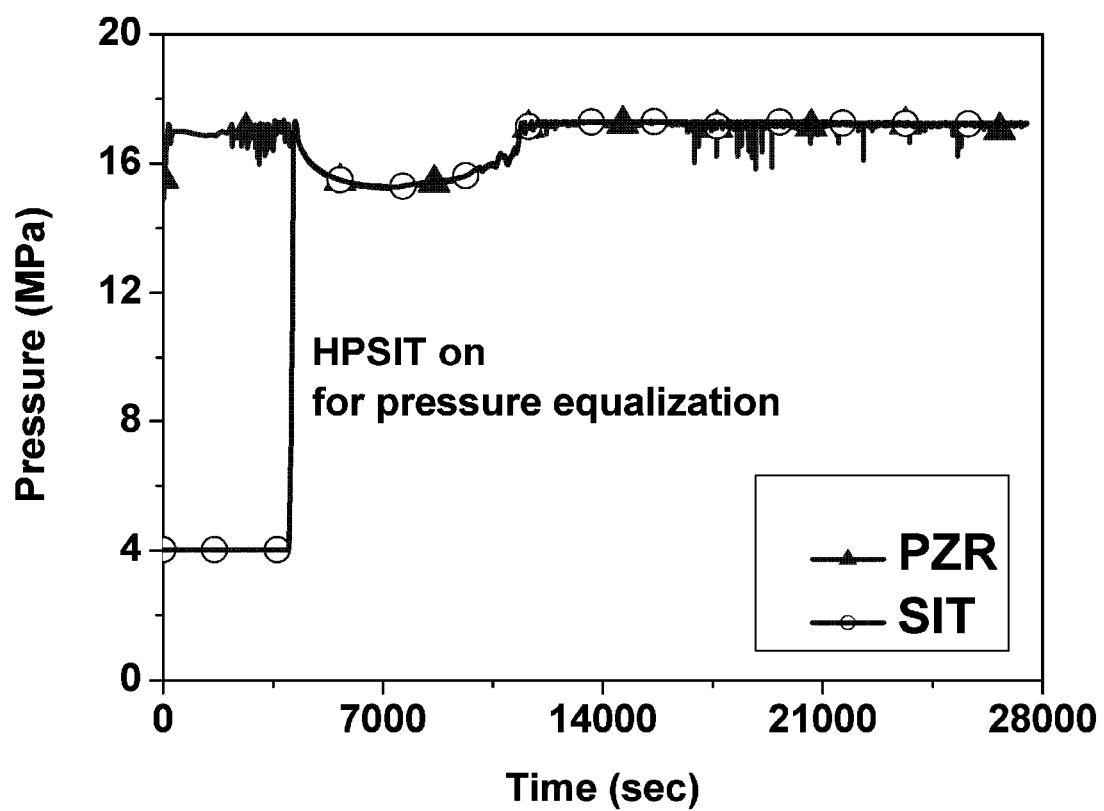
FIG. 11 is a graph representing rapid transient of the SIT from low pressure condition to high pressure condition due to high pressure from pressurizer during 'Station Blackout' accident.
Figure 12:
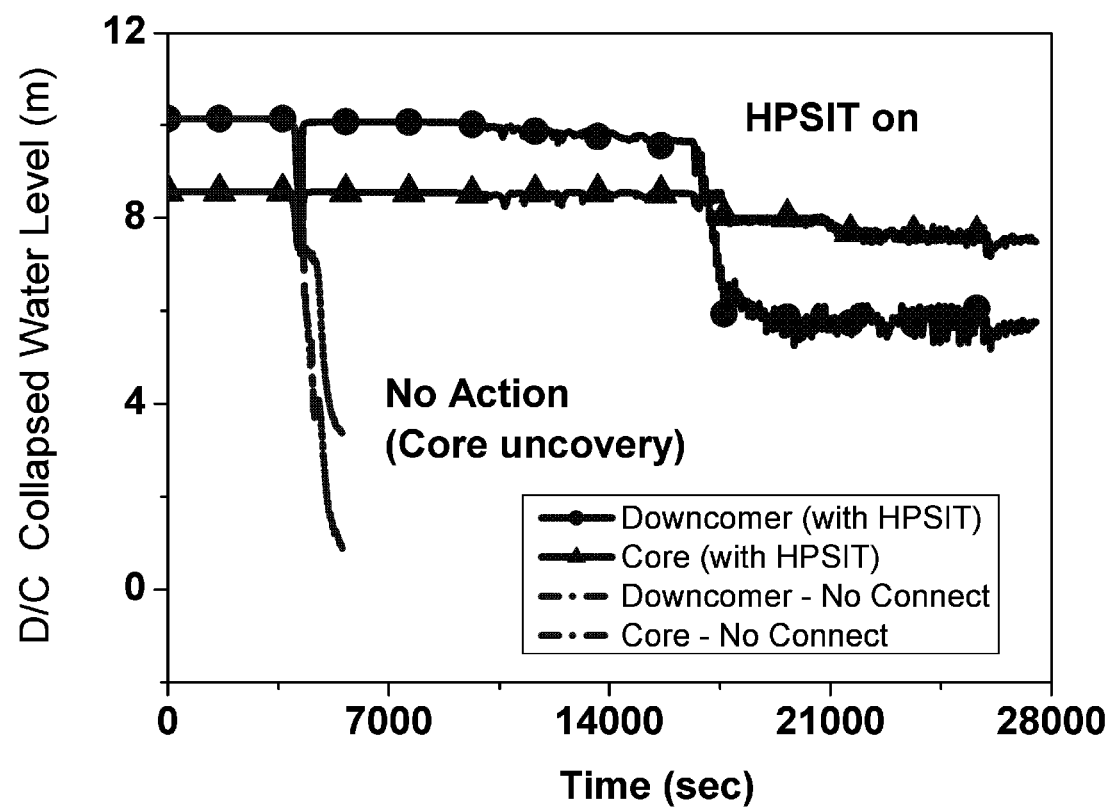
FIG. 12 is a graph representing a comparison of rechargeability of reactor system depending on operation of HPSIT system during 'Station Blackout' accident.

FIG. 11 is a graph representing a rapid transition of the SIT 40 from low pressure condition by the high pressure of the pressurizer 60 with the occurrence of the 'Station Blackout' accident. FIG. 12 is a graph representing a comparison of makeup water level of the downcomer (DC) of the reactor system, when the pressure difference between the two systems is settled, thus allowing the emergency core coolant of the SIT 40 to be introduced into the reactor system under high pressure condition that keeps the safety valve of the pressurizer open by being pressure head gravity-driven by the water level difference between the two systems. FIG. 13 is a graph representing a comparison of nuclear fuel cladding temperature of a core of the reactor system between when the SIT is operated and when the SIT is not operated during the 'Station Blackout' accident.

Figure 13:
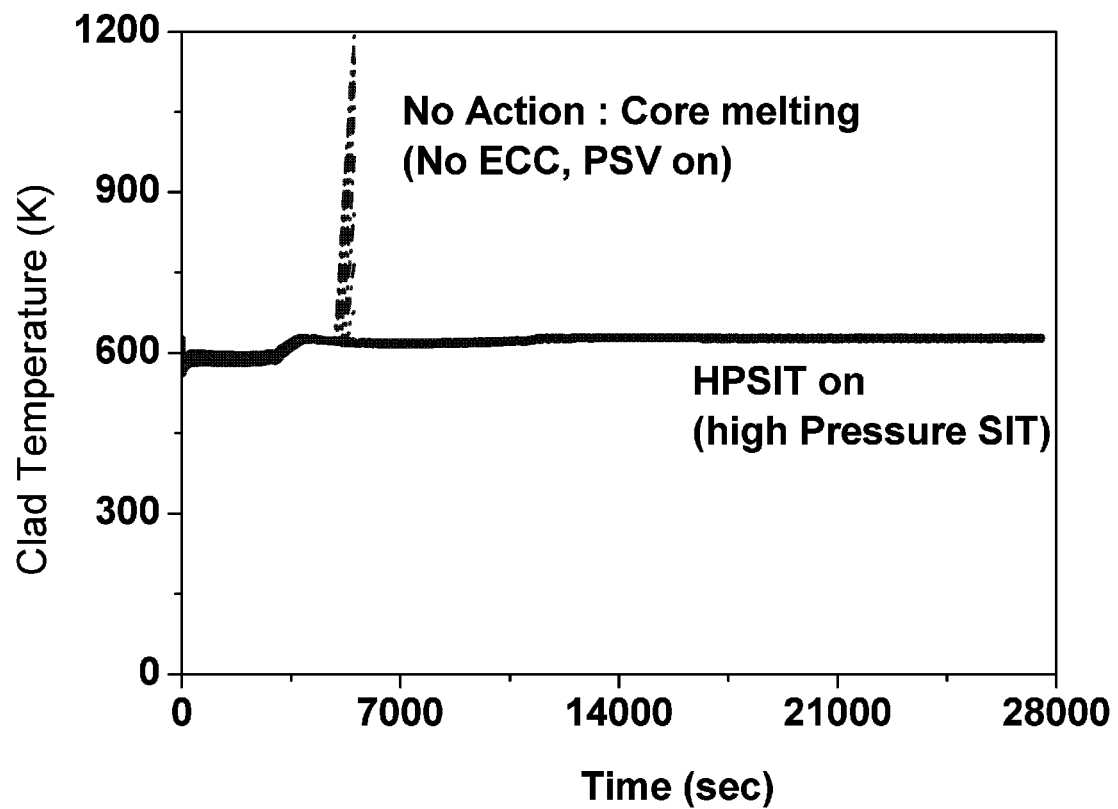
FIG. 13 is a graph representing a comparison of core heating prevention performance depending on operation of HPSIT system during 'Station Blackout' accident in which all the off-site and on-site power is lost.

Referring to FIGS. 13 to 13, the curves in blue represent the pressure of the SIT, the water level of the downcomer (DC), and the temperature of the nuclear fuel cladding during operation of the SIT, and the curves in red represent the pressure of the pressurizer, water level of the downcomer, and the temperature of the nuclear fuel cladding when the emergency core coolant is not injected.

The water level of the downcomer consistently decreases according to the release of the stem through the safety valve of the pressurizer, and rapidly within approximately 4000 to 6000 seconds. However, since the emergency core coolant is consistently injected by the gravity-driven injection of the SIT up to approximately 28000 seconds, the reactor can be maintained under high temperature and stable condition even with the SIT alone, without requiring separate makeup of emergency core coolant.

If the SIT is not operated, the temperature of the cladding escalates rapidly within approximately 4000 to 6000 seconds, but for the duration approximately of 28000 seconds until when the emergency core coolant is consistently injected by the gravity-driven injection of the SIT, the core can be maintained stably without experiencing considerable temperature climbing.

As explained above with reference to embodiments, since the pressure equalization pipe 44 and the pressure equalization valve 44*a*, selectively openable and closable, are provided to connect the upper portion of the SIT 40 and the upper portion of the pressurizer 60 to maintain the pressure equalization between the high pressure pressurizer 60 and the low pressure SIT 40, the emergency core coolant 40*a* can be recharged into the reactor system by gravity-driven injection even under high pressure accident. Accordingly, the embodiments can solve the technical limits of the conventional examples that the PLR low pressure SIT is unable to charge the emergency core coolant into the reactor system due to adverse pressure difference during an accident where the reactor system is pressurized.

Further, since the nitrogen gas exhaust pipe 46 is provided to connect the upper portion of the SIT 40 and the safety valve pipe 62 of the pressurizer 60, to allow the nitrogen gas to be selectively discharged when the high pressure steam 60*a* of the pressurizer 60 is introduced into the SIT 40, and supply a high flowrate of makeup coolant to the reactor during low pressure accident, the problems of the conventional system such as CMT system of AP600 utilizing gravity-driven injection based on simple water level difference between the systems, i.e., inefficient makeup of the low pressure reactor system, is resolved.

Accordingly, the high pressure HIT system according to an embodiment has a complex function that combines the function of the CMT which is efficient under high pressure condition and the function of SIT which is efficient under low pressure condition. That is, unlike the conventional CMT system of AP600 or CP1300 which has independent reactor core emergency makeup functions for low pressure and high pressure operations, respectively, only one SIT can enable reactor core emergency makeup both under high pressure and low pressure conditions. As a result, simplified system design, and simplified accident mitigation can be obtained, and furthermore, possibility of accidents at the reactor can be reduced.

Furthermore, the embodiment implements motor valves which are open and closed by separate battery power during 'Station Blackout' for the injection isolation valve 42*a*, the pressure equalization valve 44*a* and the nitrogen gas exhaust isolation valve 46*a*, to enable all the above valves 42*a*, 44*a*, 46*a* to operate even with the accident where off-site and on-site power is lost. As a result, the embodiment solves the limit of the conventional art in which the SIT is unable to charge the emergency core coolant into the reactor system and the valves are not activated during 'Station Blackout' accident where all the off-site and on-site power is lost.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A safety injection tank (SIT) system pressurized by inert gas and steam, for injecting emergency core coolant into a reactor vessel of a nuclear reactor system comprising:

a safety injection tank (SIT) into which the inert gas is charged and in which the emergency core coolant is housed, the SIT fluidly connected to the reactor vessel through an emergency coolant injecting pipe;

a pressurizer in which the pressurized steam is housed, and on which a safety valve pipe is mounted to discharge the pressurized steam; and a pressure equalization pipe which is selectively openable and closable, and which connects an upper portion of the SIT and an upper portion of the pressurizer to equalize the pressure between the pressurizer and the SIT when the pressure equalization pipe is open, further wherein when the pressure equalization pipe is opened, the SIT shifts from a first pressure operation mode charged with the inert gas to a second pressure operation mode, wherein the second pressure operation mode has increased pressure over the first pressure operation mode provided by the pressurized steam during an accident that pressurizes the reactor system, so that the emergency core coolant is introduced into the reactor vessel.

2. The SIT system according to claim 1, further comprising an inert gas exhaust pipe which connects the upper portion of the SIT to the safety valve pipe, wherein the safety valve pipe includes a safety valve configured discharge the inert gas when the pressurized steam of the pressurizer is introduced into the safety injection tank.

3. The SIT system according to claim 1, wherein the inert gas is nitrogen gas and the first pressure is approximately 4.3 MPa, and the second pressure is approximately 17 MPa.

4. The SIT system according to claim 2, further comprising:
an injection isolation valve mounted on the emergency coolant injection pipe;
a pressure equalization valve mounted on the pressure equalization pipe; and
an inert gas exhaust isolation valve mounted on the inert gas exhaust pipe, wherein the injection isolation valve, the pressure equalization valve, and the inert gas exhaust isolation valve are motor operated valves configured to be opened and closed by a separate battery power during station blackout event even when there is a loss of off-site and on-site power generation.

5. The SIT system according to claim 2, wherein the inert gas is nitrogen gas and the first pressure is approximately 4.3 MPa, and the second pressure is approximately 17 MPa.

6. The SIT system according to claim 4, wherein the inert gas is nitrogen gas and the first pressure is approximately 4.3 MPa, and the second pressure is approximately 17 MPa.

7. A safety injection tank (SIT) system pressurized by inert gas and steam, for injecting emergency core coolant into a reactor vessel of a nuclear reactor system comprising:
a safety injection tank (SIT) into which the inert gas is charged and in which the emergency core coolant is housed, the SIT fluidly connected to the reactor vessel through an emergency coolant injection pipe, the SIT configured to shift between a plurality of emergency core coolant injection modes, the emergency core coolant injection modes including at least a first pressure operation mode and a second pressure operation mode,
a pressurizer for storing the pressurized steam,
a pressure equalization pipe comprising a pressure equalization valve that connects the SIT to the pressurizer, wherein the pressure equalization valve is selectively openable to equalize the pressure between the pressurizer and the SIT, further wherein opening of the pressure equalization valve causes the SIT to shift from the first pressure operation mode to the second pressure operation mode,
wherein in the first pressure operation mode the inert gas charged SIT is configured to inject the emergency core coolant into the reactor system under a first pressure condition of the reactor system, and wherein in the second pressure operation mode, the pressure equalization valve is opened to provide increased pressure by the pressurized steam to the SIT to inject the emergency core coolant into the reactor system under a second pressure condition of the reactor system; and
one or more valves, comprising at least the pressure equalization valve, wherein the one or more valves are driven by a backup emergency power source during a station blackout accident with a loss of off-site and on-site power including emergency generators of a nuclear power plant due to malfunction, to thereby enable injection of the emergency core coolant into the reactor system.

8. The SIT system according to claim 7, further comprising:
an emergency coolant injecting pipe connecting the SIT to the reactor vessel;
wherein the pressurizer comprises a safety valve pipe to discharge the pressurized steam; and
wherein the SIT is configured to shift from the first pressure operation mode to the second pressure operation mode such that the emergency core coolant in the SIT is capable of being introduced into the reactor vessel even when the pressure in the reactor system exceeds the pressure of the SIT in the low pressure operation mode.

9. The SIT system according to claim 7, wherein the inert gas is nitrogen gas and the first pressure is approximately 4.3 MPa, and the second pressure is approximately 17 MPa.

10. The SIT system according to claim 8, further comprising an inert gas exhaust pipe which connects an upper portion of the SIT to the safety valve, wherein the safety valve is configured to selectively discharge inert gas when the pressurized steam of the pressurizer is introduced into the SIT.

11. The SIT system according to claim 8, wherein the inert gas is nitrogen gas and the first pressure is approximately 4.3 MPa, and the second pressure is approximately 17 MPa.

12. The SIT system according to claim 10 wherein the one or more valves comprise:
an injection isolation valve mounted on the emergency coolant injection pipe;
the pressure equalization valve mounted on the pressure equalization pipe; and
an inert gas exhaust isolation valve mounted on the inert gas exhaust pipe, wherein the injection isolation valve, the pressure equalization valve, and the inert gas exhaust isolation valve are motor operated valves configured to be opened and closed during a station blackout event even when there is a loss of off-site and on-site power generation.

13. The SIT system according to claim 10, wherein the inert gas is nitrogen gas and the first pressure is approximately 4.3 MPa, and the second pressure is approximately 17 MPa.

14. The SIT system according to claim 12, wherein the inert gas is nitrogen gas and the first pressure is approximately 4.3 MPa, and the second pressure is approximately 17 MPa.

* * * * *